(12) United States Patent
Nakamata

(10) Patent No.: US 7,966,019 B2
(45) Date of Patent: Jun. 21, 2011

(54) APPARATUS, METHOD AND COMPUTER PROGRAM PRODUCT PROVIDING RADIO LINK PARAMETER UPDATE FOR REALLOCATION OF HARQ PROCESS FOR 2MS NST/ST

(75) Inventor: Masatoshi Nakamata, Kanagawa (JP)

(73) Assignee: Nokia Corporation, Espoo (FI)

( * ) Notice: Subject to any disclaimer, the term of this patent is extended or adjusted under 35 U.S.C. 154(b) by 887 days.

(21) Appl. No.: 11/591,407

(22) Filed: Oct. 31, 2006

(65) Prior Publication Data
US 2007/0116002 A1     May 24, 2007

Related U.S. Application Data

(60) Provisional application No. 60/735,703, filed on Nov. 10, 2005, provisional application No. 60/733,159, filed on Nov. 2, 2005.

(51) Int. Cl.
*H04W 72/04* (2009.01)
(52) U.S. Cl. .......................... 455/451; 370/322; 370/329
(58) Field of Classification Search .................. 370/310, 370/312, 322, 329, 331, 338, 444, 469; 455/412.2, 455/451, 512
See application file for complete search history.

(56) References Cited

U.S. PATENT DOCUMENTS

| 7,321,589 | B2 * | 1/2008 | Lohr et al. ..................... 370/394 |
| 7,471,693 | B2 * | 12/2008 | Petrovic et al. ............... 370/444 |
| 2003/0147371 | A1 * | 8/2003 | Choi et al. ..................... 370/341 |
| 2004/0009767 | A1 * | 1/2004 | Lee et al. ..................... 455/422.1 |
| 2005/0041588 | A1 * | 2/2005 | Kim et al. ..................... 370/236 |
| 2005/0181816 | A1 * | 8/2005 | Han et al. ..................... 455/522 |
| 2005/0207374 | A1 * | 9/2005 | Petrovic et al. ............... 370/331 |
| 2005/0250497 | A1 * | 11/2005 | Ghosh et al. ................... 455/436 |
| 2006/0092869 | A1 * | 5/2006 | Herrmann ..................... 370/314 |
| 2006/0092972 | A1 * | 5/2006 | Petrovic et al. ............... 370/469 |

(Continued)

FOREIGN PATENT DOCUMENTS

| JP | 2005521360 | 7/2005 |
| WO | WO-03/088695 A1 | 10/2003 |

OTHER PUBLICATIONS

R2-052385; 3GPP TSG-RAN WG2 Meeting #48bis; HARQ Process restriction/reservation for non-scheduled transmissions; Cannes, France Oct. 10-14, 2005; retrieved from the internet: http://www.3gpp.org/ftp/tsg_ran/WG2_RL2/TSGR2?48bis/Documents, the whole document.

(Continued)

*Primary Examiner* — Nghi H Ly
*Assistant Examiner* — Myron Wyche
(74) *Attorney, Agent, or Firm* — Harrington & Smith

(57) ABSTRACT

A method, apparatus, and computer program for re-allocating a hybrid automatic repeat request HARQ process is described where a Node B initiates HARQ re-allocation by sending to a radio network controller RNC a RL PARAMETER UPDATE INDICATION message that includes at least one of a HARQ process allocation for 2 ms non-scheduled transmission NST GRANT information element IE and a HARQ process allocation for 2 ms scheduled transmission ST GRANT IE indicating a value for HARQ process re-allocation. The Node B then receives from the RNC a RL RECONFIGURATION PREPARE or REQUEST message that contains the NST or ST GRANT IE. Responsive to receiving the RL RECONFIGURATION PREPARE or REQUEST message, the Node B sends to the RNC a RL RECONFIGURATION READY or RESPONSE message, then receives from the RNC a RL RECONFIGURATION COMMIT message. Responsive to the COMMIT message, the Node B re-allocates the HARQ process according to the RL RECONFIGURATION PREPARE or REQUEST message.

20 Claims, 9 Drawing Sheets

U.S. PATENT DOCUMENTS

| | | | | |
|---|---|---|---|---|
| 2006/0120404 | A1* | 6/2006 | Sebire et al. | 370/469 |
| 2008/0076432 | A1* | 3/2008 | Senarath et al. | 455/442 |
| 2008/0123595 | A1* | 5/2008 | Lindheimer et al. | 370/331 |
| 2009/0034487 | A1* | 2/2009 | Lohr et al. | 370/335 |
| 2010/0135220 | A1* | 6/2010 | Bergstrom et al. | 370/329 |

OTHER PUBLICATIONS

3GPP T2 25.433 V6.7.0 (Sep. 2005); $3^{rd}$ Generation Partnership Project; Technical Specification Group Radio Access Network; UTRAN Iub interface Node B Application Part (NBAP) signaling (Release 6); retrieved from the internet: http//www.3gpp.org/ftp/Specs/html-info/25433.htm, p. 118-125.

"H-ARQ Restriction and Reservation for Non-scheduled Transmission", NEC TSG-RAN Working Group2 #48, 2005, 3 pages.

"HARQ Process Management for E-DCH", 3 GPP TSG-RAN WG3 Meeting #49, R3-051325, 2005, 25 pages.

"HARQ Process Management for E-DCH", 3 GPP TSG-RAN WG3 Meeting #49, R3-051326, 2005, 25 pages.

"Technical Specification Group Radio Access Network; UTRAN Iub interface Node Application Part (NBAP) signaling (Release 6)", 3GPP TS 25,433 V6.7.0, 2005, pp. 100-113, 144-145, 252, 328-332.

ETSI TS 125 433 V6.7.0 (Sep. 2005); Universal Mobile Telecommunications Systems (UMTS); UTRAN Iub interface Node B Application Part (NBAP) Signalling (3GPP TS 25.433 version 6.7.0 Release 6).

* cited by examiner

RADIO LINK PARAMETER UPDATE INDICATION: FDD MESSAGE

| IE/GROUP NAME | PRESENCE | RANGE | IE TYPE AND REFERENCE | SEMANTICS DESCRIPTION | CRITICALITY | ASSIGNED CRITICALITY |
|---|---|---|---|---|---|---|
| MESSAGE DISCRIMINATOR | M | | 9.2.1.45 | | – | |
| MESSAGE TYPE | M | | 9.2.1.46 | | YES | REJECT |
| TRANSACTION ID | M | | 9.2.1.62 | | – | |
| CRNC COMMUNICATION CONTEXT ID | M | | 9.2.1.18 | THE RESERVED VALUE "ALL CRNCCC" SHALL NOT BE USED | YES | IGNORE |
| HS-DSCH FDD UPDATE INFORMATION | O | | 9.2.2.18Ea | | YES | IGNORE |
| HARQ PROCESS ALLOCATION FOR 2ms NON-SCHEDULED TRANSMISSION CHANGE INDICATOR | O | | 9.2.2.x1 | | YES | IGNORE |

| IE/GROUP NAME | PRESENCE | RANGE | IE TYPE AND REFERENCE | SEMANTICS DESCRIPTION |
|---|---|---|---|---|
| E-DCH MAC-d FLOW SPECIFIC INFORMATION RESPONSE | | | | |
| >E-DCH MAC-d FLOW ID | M | 0..<maxnoof EDCHMACdFlows> | 9.2.2.130 | |

| IE/GROUP NAME | PRESENCE | RANGE | IE TYPE AND REFERENCE | SEMANTICS DESCRIPTION |
|---|---|---|---|---|
| HS-SCCH CODE CHANGE GRANT | | | ENUMERATED (CHANGE GRANTED) | |

28

| IE/GROUP NAME | PRESENCE | RANGE | IE TYPE AND REFERENCE | SEMANTICS DESCRIPTION |
|---|---|---|---|---|
| THE E-DCH FDD INFORMATION TO MODIFY IE IS USED FOR THE MODIFICATION OF AN E-DCH. | | | | |
| E-DCH MAC-d FLOW SPECIFIC INFORMATION | | 0..<maxno ofEDCH MACdFlows> | | |
| >E-DCH MAC-d FLOW ID | M | | 9.2.2.130 | |
| >ALLOCATION/RETENTION PRIORITY | O | | 9.2.1.1A | |
| >TRANSPORT BEARER REQUEST INDICATOR | M | | 9.2.1.62A | |
| >TNL QoS | O | | 9.2.1.58A | |
| >MAXIMUM NUMBER OF RETRANSMISSIONS FOR E-DCH | O | | 9.2.2.20D | |
| >E-DCH HARQ POWER OFFSET FDD | O | | 9.2.2.13.Dk | |
| >E-DCH MAC-d FLOW MULTIPLEXING LIST | O | | 9.2.2.13.Dl | |
| >CHOICE E-DCH GRANT TYPE | O | | | |
| >>E-DCH NON-SCHEDULED TRANSMISSION GRANT | | | | |

FIG.6A

| FIG.6A |
|---|
| FIG.6B |

| | | | |
|---|---|---|---|
| >>>MAXIMUM NUMBER OF BITS PER MAC-e PDU FOR NON-SCHEDULED TRANSMISSION | M | | 9.2.2.13Dm |
| >>>HARQ PROCESS ALLOCATION FOR 2ms NON-SCHEDULED TRANSMISSION GRANT | O | | 9.2.2.13Dn | IF THIS IE IS NOT INCLUDED, TRASMISSION IN ALL HARQ PROCESSES IS ALLOWED |
| >>E-DCH SCHEDULED TRANSMISSION GRANT | | | NULL | |
| >BUNDLING MODE INDICATOR | O | | 9.2.2.1Bb | |
| >E-DCH LOGICAL CHANNEL TO ADD | O | | E-DCH LOGICAL CHANNEL INFORMATION 9.2.2.13K | |
| >E-DCH LOGICAL CHANNEL TO MODIFY | O | | 9.2.2.13L | |
| >E-DCH LOGICAL CHANNEL TO DELETE | | 0..<maxnooflo gicalchannels> | | |
| >>LOGICAL CHANNEL ID | M | | 9.2.2.18c | |
| >>>HARQ PROCESS ALLOCATION FOR 2ms NON-SCHEDULED TRANSMISSION CHANGE GRANT | O | | 9.2.2.x2 | |
| | | 0-Max noof EDCH MAC-d FLOWS | | MAXIMUM NUMBER OF E-DCH MA-d FLOWS |
| | | 0-Max no of DDIs | | MAXIMUM NUMBER OF DATA DESCRIPTION INDICATORS |

22

RADIO LINK PARAMETER UPDATE INDICATION: FDD MESSAGE

| IE/GROUP NAME | PRESENCE | RANGE | IE TYPE AND REFERENCE | SEMANTICS DESCRIPTION | CRITICALITY | ASSIGNED CRITICALITY |
|---|---|---|---|---|---|---|
| MESSAGE DISCRIMINATOR | M | | 9.2.1.45 | | – | |
| MESSAGE TYPE | M | | 9.2.1.46 | | YES | REJECT |
| TRANSACTION ID | M | | 9.2.1.62 | | – | |
| CRNC COMMUNICATION CONTEXT ID | M | | 9.2.1.18 | THE RESERVED VALUE "ALL CRNCCC" SHALL NOT BE USED | YES | IGNORE |
| HS-DSCH FDD UPDATE INFORMATION | O | | 9.2.2.18Ea | | YES | IGNORE |
| *E-DCH FDD UPDATE INFORMATION* | *O* | | *9.2.2.xx* | | *YES* | *IGNORE* |

| IE/GROUP NAME | PRESENCE | RANGE | IE TYPE AND REFERENCE | SEMANTICS DESCRIPTION |
|---|---|---|---|---|
| E-DCH MAC-d FLOW SPECIFIC INFORMATION | | 0..<maxno ofEDCH MACdFlows> | | |
| >E-DCH MAC-d FLOW ID | M | | 9.2.2.130 | |
| >HARQ PROCESS ALLOCATION FOR 2ms NON-SCHEDULED TRANSMISSION GRANT | M | | HARQ PROCESS ALLOCATION FOR 2 ms TTI. 9.2.2.13Dn | |
| HARQ PROCESS ALLOCATION FOR 2ms SCHEDULED TRANSMISSION GRANT | O | | HARQ PROCESS ALLOCATION FOR 2 ms TTI 9.2.2.13Dn | |

FIG.9

APPARATUS, METHOD AND COMPUTER PROGRAM PRODUCT PROVIDING RADIO LINK PARAMETER UPDATE FOR REALLOCATION OF HARQ PROCESS FOR 2MS NST/ST

CROSS-REFERENCE TO A RELATED PROVISIONAL PATENT APPLICATION

This application claims priority to U.S. Provisional Patent Application No. 60/735,703 (filed on Nov. 10, 2005), and also to U.S. Provisional Patent Application No. 60/733,159 (filed on Nov. 2, 2005), and the contents of both provisional applications are hereby incorporated by reference.

TECHNICAL FIELD

The exemplary and non-limiting embodiments of this invention relate generally to wireless communication systems and, more specifically, relate to wireless data packet access methods, apparatus and computer program products.

BACKGROUND

The following abbreviations are defined as follows, at least some of which appear in the ensuing description:

| | |
|---|---|
| DCH | Dedicated Channel |
| E-DCH | Enhanced Uplink DCH |
| HARQ | Hybrid Automatic Repeat Request |
| HSUPA | High Speed Uplink Packet Access |
| HW | Hardware |
| IE | Information Element |
| Iub | Interface between RNC and Node B |
| Iur | Logical interface between two RNCs |
| MAC | Medium Access Control |
| MAC-d | MAC entity that handles dedicated transport channels (DCH) |
| NBAP | Node B Application Part |
| Node B | Base station |
| NST | Non-Scheduled Transmission |
| PDU | Protocol Data Unit |
| RLC | Radio Link Control |
| RNC | Radio Network Controller |
| RNSAP | Radio Network Subsystem Application Part |
| RRC | Radio Resource Control |
| SHO | Soft Hand Off |
| SRNC | Serving Radio Network Controller |
| ST | Scheduled Transmission |
| UE | User Equipment, e.g., a mobile terminal |
| UTRAN | Universal Terrestrial Radio Access Network |

Of interest herein is the HSUPA for packet data traffic in, for example, Release 6 of 3GPP TS 25.309, 3rd Generation Partnership Project; Technical Specification Group Radio Access Network; FDD Enhanced Uplink; Overall Description; Stage 2.

In HSUPA, certain attempts at enhancements are currently approached by distributing some of the packet scheduler functionality to the set of Node Bs to provide faster scheduling of bursty, non-real-time traffic than can be provided by the Layer 3 (L3, Network Layer) of the RNC. The idea is that with faster link adaptation it is possible to more efficiently share the uplink power resource between packet data users, as when packets have been transmitted from one user the scheduled resource can be made available immediately to another user. This technique attempts to avoid the peaked variability of noise rise, such as when high data rates are being allocated to users that are running bursty, high data-rate applications.

In the current architecture, the packet scheduler is located in the RNC and therefore is limited in its ability to adapt to the instantaneous traffic, because of bandwidth constraints on the RRC signaling interface between the RNC and the UE. Hence, to accommodate the variability, the packet scheduler must be conservative in allocating uplink power to take into account the influence from inactive users in the following scheduling period, a solution which turns out to be spectrally inefficient for high allocated data-rates and long release timer values.

As general background, current HARQ process management for NST in 3GPP TS 25.309, v6.3.0 (2005-06), FDD Enhanced Uplink Overall Description Stage 2, for 2 ms TTI is as follows:

The UTRAN can restrict a non-scheduled MAC-d flow to use a limited number of H-ARQ processes, i.e.: a HARQ process that is "NST restricted" can be used by NST and ST; and when the UE has a set of "NST restricted" HARQ processes, processes that are not in this set cannot be used by NST, i.e. they can only be used by ST.

The UTRAN can reserve some HARQ processes for NST, i.e.: a HARQ process that is "NST reserved" can only be used by NST; and a H-ARQ process that is not "NST reserved" can be used by NST and ST. "NST restricted" and "NST reserved" can also be applied to H-ARQ processes on the same UE, or to the same H-ARQ process, e.g.: H-ARQ processes that are both "NST reserved" and "NST restricted" can only be used by NST.

Of most interest to this invention is a determination as to which node should be responsible for reserving the HARQ process for 2 ms NST for the UE, the SRNC or the Node B (e.g., the serving Node B).

Arguments to support the SRNC controlling the HARQ process are that the SRNC is better positioned to calculate the number of processes which are required for the NST, and that Iub/Iur signaling is simpler to implement, and results in fewer delays. An argument to support the Node B controlling the HARQ process is that the Node B has the best knowledge of available HW resources and similar local issues.

However, a problem arises in the second approach since there is no means for the Node B, after reserving a HARQ process, to re-allocate the HARQ process except when the Node B receives a NBAP/RNSAP message with a request to execute a serving cell change, or to add new NST connection, for example, from the SRNC. Because of these limitations, the Node B cannot be expected to manage the HW resources in an efficient manner.

SUMMARY

The foregoing and other problems are overcome, and other advantages are realized, in accordance with the presently described embodiments of these teachings.

In accordance with an exemplary embodiment of the invention, there is provided a method for re-allocating a hybrid automatic repeat request process. In the method, a first message for re-allocating a hybrid automatic repeat request process is sent from a Node B, and a reply to the first message is received at the Node B. Responsive to the reply, the hybrid automatic repeat request process is re-allocated according to the reply.

In accordance with another exemplary embodiment of the invention, there is provided a method for re-allocating a hybrid automatic repeat request HARQ process. In this method, a Node B initiates HARQ re-allocation by sending from the Node B to a controlling/serving radio network controller SRNC a RL PARAMETER UPDATE INDICATION message that includes at least one of a HARQ process allocation for 2 ms non-scheduled transmission NST GRANT information element and a HARQ process allocation for 2 ms scheduled transmission ST GRANT information element indicating a value for HARQ process re-allocation. The Node B then receives from the SRNC one of a RL RECONFIGURATION PREPARE message and a RL RECONFIGURATION REQUEST message that contains the said at least one information element. Responsive to receiving the RL RECONFIGURATION PREPARE message or the RL RECONFIGURATION REQUEST message, the Node B sends to the SRNC a RL RECONFIGURATION READY message or a RL RECONFIGURATION RESPONSE message. The Node B then receives from the SRNC a RL RECONFIGURATION COMMIT message, and responsive to receiving the COMMIT message, it re-allocates the HARQ process according to the received RL RECONFIGURATION PREPARE message or RL RECONFIGURATION REQUEST message.

In accordance with another exemplary embodiment of the invention, there is provided another method for re-allocating a hybrid automatic repeat request HARQ process. In this method, a RL PARAMETER UPDATE INDICATION message is received from a Node B, and that message includes at least one of a HARQ process allocation for 2 ms non-scheduled transmission NST GRANT information element and a HARQ process allocation for 2 ms scheduled transmission ST GRANT information element indicating a value for HARQ process re-allocation. Responsive to receiving the RL PARAMETER UPDATE INDICATION message, one of a RL RECONFIGURATION PREPARE message and a RL RECONFIGURATION REQUEST message that contains the said at least one information element is sent to the Node B. Responsive to receiving from the Node B one of a RL RECONFIGURATION READY message or a RL RECONFIGURATION RESPONSE message, a RL RECONFIGURATION COMMIT message is then sent to the Node B.

In accordance with another exemplary embodiment of the invention, there is provided a first network element that includes a wireless transceiver and a program of computer instructions embodied in a local memory that is coupled to a processor. The processor is also coupled to a communications interface for coupling with a higher network element such as one controlling the first network element. The program is arranged to cause the processor to send to the higher network element over the interface a first message for re-allocating a hybrid automatic repeat request process for a user equipment with which the first network element communicates using the wireless transceiver. A reply to the first message is received over the interface, and responsive to the reply, the processor operates to re-allocate the HARQ process according to the reply.

In accordance with another exemplary embodiment of the invention, there is provided a controlling network element that includes a program of computer instructions embodied in a local memory that is coupled to a processor. The processor is also coupled to a communications interface for coupling with a Node B, and the program is arranged to cause the processor, responsive to receiving from the Node B over the interface a first message for re-allocating a HARQ process, to send over the interface to the Node B a reply to grant the re-allocation of the first message.

In accordance with another exemplary embodiment of the invention, there is provided a program of machine-readable instructions, tangibly embodied on an information bearing medium disposed within a Node B and executable by a digital data processor, to perform actions directed toward re-allocating a hybrid automatic repeat request process. In this embodiment, the actions include sending from a Node B a first message for re-allocating a hybrid automatic repeat request process, and, responsive to receiving a reply to the first message, re-allocating the hybrid automatic repeat request process according to the reply.

In accordance with another exemplary embodiment of the invention, there is provided another program of machine-readable instructions, tangibly embodied on an information bearing medium disposed within a controlling node of a radio network and executable by a digital data processor, to perform actions directed toward re-allocating a hybrid automatic repeat request process. In this embodiment the actions include receiving from a Node B a RL PARAMETER UPDATE INDICATION message that includes at least one of a HARQ process allocation for 2 ms non-scheduled transmission NST GRANT information element and a HARQ process allocation for 2 ms scheduled transmission ST GRANT information element indicating a value for HARQ process re-allocation. Responsive to receiving the RL PARAMETER UPDATE INDICATION message, the actions then include sending to the Node B one of a RL RECONFIGURATION PREPARE message and a RL RECONFIGURATION REQUEST message that contains the said at least one information element, and, responsive to receiving from the Node B one of a RL RECONFIGURATION READY message or a RL RECONFIGURATION RESPONSE message, sending to the Node B a RL RECONFIGURATION COMMIT message.

In accordance with another exemplary embodiment of the invention, there is provided an integrated circuit in combination with software embodied on a computer readable medium, all disposed within a Node B. The integrated circuit and the software are configured to cooperate so as to signal for a re-allocation of a hybrid automatic repeat request process by sending from the Node B to a controlling node of a radio network a RL PARAMETER UPDATE INDICATION message that includes at least one of a HARQ process allocation for 2 ms non-scheduled transmission NST GRANT information element and a HARQ process allocation for 2 ms scheduled transmission ST GRANT information element indicating a value for hybrid automatic repeat request process re-allocation. Further, and responsive to receiving from the controlling node one of a RL RECONFIGURATION PREPARE message and a RL RECONFIGURATION REQUEST message that contains the said at least one information element, they cooperate to send to the controlling node one of a RL RECONFIGURATION READY message or a RL RECONFIGURATION RESPONSE message. Responsive to receiving from the controlling node a RL RECONFIGURATION COMMIT message, the hybrid automatic repeat request process is re-allocated according to the RL RECONFIGURATION PREPARE message.

In accordance with another exemplary embodiment of the invention, there is provided a system comprising a Node B coupled through a communication interface to a controlling node of a radio network. Each of the Node B and the controlling node include embodied software and a processor. At the Node B, they are configured to send to the controlling node a RL PARAMETER UPDATE INDICATION message that includes at least one of a HARQ process allocation for 2 ms non-scheduled transmission NST GRANT information element and a HARQ process allocation for 2 ms scheduled transmission ST GRANT information element indicating a value for hybrid automatic repeat request process re-allocation. Still at the Node B and responsive to receiving from the controlling node one of a RL RECONFIGURATION PRE- PARE message and a RL RECONFIGURATION REQUEST message, the Node B sends to the controlling node one of a RL RECONFIGURATION READY message and a RL RECONFIGURATION RESPONSE message. At the controlling node, and responsive to receiving the PARAMETER UPDATE INDICATION, one of the RL RECONFIGURATION PREPARE message and the RL RECONFIGURATION REQUEST message that contains the said at least one information element is sent to the Node B. Responsive to receiving from the Node B one of the RL RECONFIGURATION READY message and the RL RECONFIGURATION RESPONSE message, the controlling node sends to the Node B a RL RECONFIGURATION COMMIT message indicating to the Node B to re-allocate the hybrid automatic repeat request process.

Further details as to various embodiments and implementations are detailed below.

BRIEF DESCRIPTION OF THE DRAWINGS:

The foregoing and other aspects of these teachings are made more evident in the following Detailed Description, when read in conjunction with the attached Drawing Figures.

FIGS. 4-9 are tables of message contents for signaling according to the described embodiments, where new information elements detailed herein are offset by shading.

Figure 1:
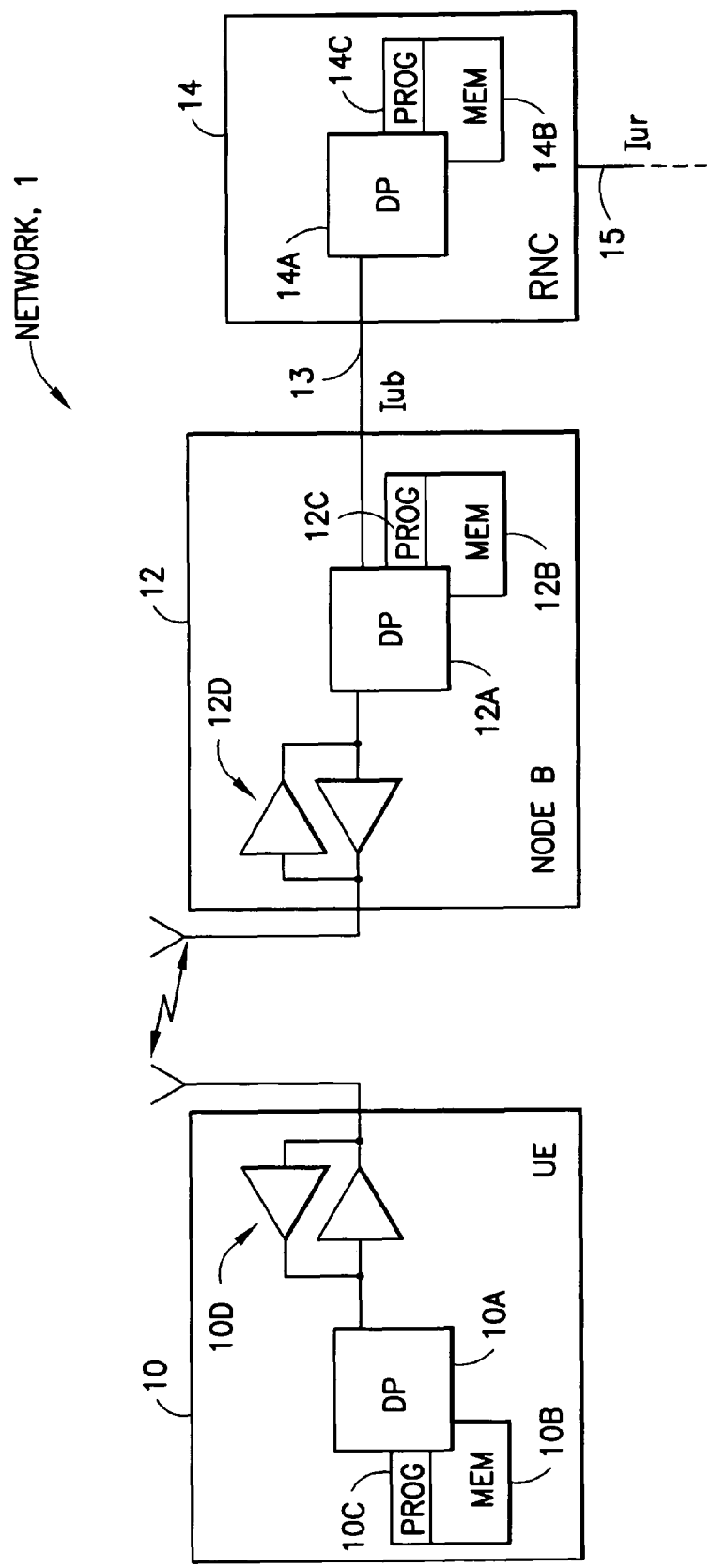
FIG. 1 shows a simplified block diagram of various electronic devices that are suitable for use in practicing the exemplary embodiments of this invention.

DETAILED DESCRIPTION:

Reference is made first to FIG. 1 for illustrating a simplified block diagram of various electronic devices that are suitable for use in practicing the exemplary embodiments of this invention. In FIG. 1 a wireless network 1 is adapted for communication with a UE 10 via a Node B (e.g., base station) 12. The network 1 may include a controlling node of a network of Node B's such as an RNC 14, which may be referred to as a serving RNC (SRNC) or equivalently a controlling RNC. The UE 10 includes a data processor (DP) 10A, a memory (MEM) 10B that stores a program (PROG) 10C, and a suitable radio frequency (RF) transceiver 10D for bidirectional wireless communications with the Node B 12, which also includes a DP 12A, a MEM 12B that stores a PROG 12C, and a suitable RF transceiver 12D. The Node B 12 is coupled via a data path 13 (Iub) to the controlling node 14 that also includes a DP 14A and a MEM 14B storing an associated PROG 14C. The controlling node 14 may be coupled to another controlling node (not shown) by another data path 15 (Iur).

The Node B 12 of FIG. 1 is assumed to be the serving Node B for the illustrated UE 10. As will be evident below with respect to FIGS. 2-3, some signaling according to embodiments of this invention may also involve a non-serving Node B 16, shown in FIGS. 2-3. Such a non-serving Node B 16 may have a processor, memory, locally stored programs, and transceiver as described above for the serving Node B 12. It is noted that in some embodiments the non-serving Node B 16 need not be under direct control of the same controlling node 14 as the serving Node B 12, and in other embodiments the non-serving Node B 16 must be under control of the same controlling node 14 as the serving Node B in order to facilitate the HARQ process reallocation detailed below.

At least one of the PROGs 10C, 12C and 14C is assumed to include program instructions that, when executed by the associated DP, enable the electronic device to operate in accordance with the exemplary embodiments of this invention. More particularly, the embodiments of this invention may be implemented by computer software (PROG 12C, 14C) executable at least by the DP 12A of the Node B 12 and the DP 14A of the RNC 14, or by hardware, or by a combination of software and hardware, as will be discussed below in greater detail.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

The exemplary embodiments of this invention allow the Node B 12, that reserves the hybrid automatic repeat request process for a 2 ms NST, to re-allocate the hybrid automatic repeat request processes at anytime for managing the HW resources efficiently. This is accomplished by the introduction of new information elements IEs into RNSAP/NBAP signaling. NBAP signaling relates to signaling between the Node B and the controlling node, and RNSAP signaling relates to signaling when the UE is connected over an Iur interface.

The exemplary embodiments of this invention provide for the introduction of a new IE (referred to, by example, as "HARQ Process Allocation For 2 ms Non-Scheduled Transmission Change Indicator") that indicates to the controlling node 14 that the Node B 12 desires to re-allocate the hybrid automatic repeat request process for the NST. In an embodiment, this new change-indicator IE 20 (see FIG. 4) is sent in a NBAP/RNSAP RADIO LINK PARAMETER UPDATE message.

If the Node B 12 determines a need to update the hybrid automatic repeat request process allocation for non-scheduled transmission, and/or the hybrid automatic repeat request process allocation for scheduled transmission, the Node B 12 can initiate with a RADIO LINK PARAMETER UPDATE INDICATION message, which includes the HARQ PROCESS ALLOCATION FOR 2 ms NON-SCHEDULED TRANSMISSION GRANT IE for the concerned MAC-d flows, and/or the HARQ PROCESS ALLOCATION FOR 2 ms SCHEDULED TRANSMISSION GRANT IE.

The exemplary embodiments of this invention provide further for the introduction of a new IE (referred to, by example, as "HARQ Process Allocation For 2 ms Non-Scheduled Transmission Change Grant") that indicates that the controlling node 14 grants the Node B 12 permission to re-allocate the hybrid automatic repeat request process for the NST. In an embodiment, this new change-grant IE 22 (see FIG. 6) is sent in a NBAP/RNSAP RADIO LINK RECONFIGURATION PREPARE/REQUEST message.

An exemplary signaling flow between the UE 10, serving Node B 12 and controlling node 14 (and in certain instances also non-serving Node Bs 16) is described with reference to FIG. 2.

The Node B 12 determines that it will re-allocate a hybrid automatic repeat request process for NST and sends the controlling node 14 a RADIO LINK PARAMETER UPDATE message 30 with the new change-indicator IE 20 (HARQ Process Allocation For 2 ms Non-Scheduled Transmission Change Indicator) that indicates the request to the controlling node 14.

The controlling node 14 determines to grant the request after the reception of the RADIO LINK PARAMETER UPDATE message 30, and in response sends the serving Node B 12 the RADIO LINK RECONFIGURATION PREPARE message 32 with the new change-grant IE 22 (HARQ Process Allocation For 2 ms Non-Scheduled Transmission Change Grant) to indicate the granted permission. In an unsynchronized radio link reconfiguration procedure, a RADIO LINK RECONFIGURATION REQUEST message is used instead of the above PREPARE message.

In response to receiving the change-grant IE 22 in the RECONFIGURATION PREPARE message 32 (or REQUEST message), the Node B 12 re-allocates the hybrid automatic repeat request process, and informs the controlling node 14 by including the change-grant IE 22, the "HARQ Process Allocation For 2 ms Non-Scheduled Transmission Grant" IE (which is defined as signaling from the controlling node/SRNC/CRNC 14 to the Node B 12, see 3GPP TS25.423/433 v.6.7.0) in a RADIO LINK RECONFIGURATION READY message 34 (or alternatively in a RADIO LINK RECONFIGURATION RESPONSE message for the case of an unsynchronized radio link reconfiguration procedure). In an embodiment where the grant by the controlling node 14 is limited to either granting or denying the specific allocation change requested by the Node B 12 in the RL PARAMETER UPDATE message 30, the value of the change-grant IE 22 is the same as the change-indicator IE 20, else the requested allocation change is denied. In another embodiment where the controlling node 14 may grant an allocation other than that specifically requested by the Node B 12, the values of those IEs 20, 22 may differ.

Figure 2:
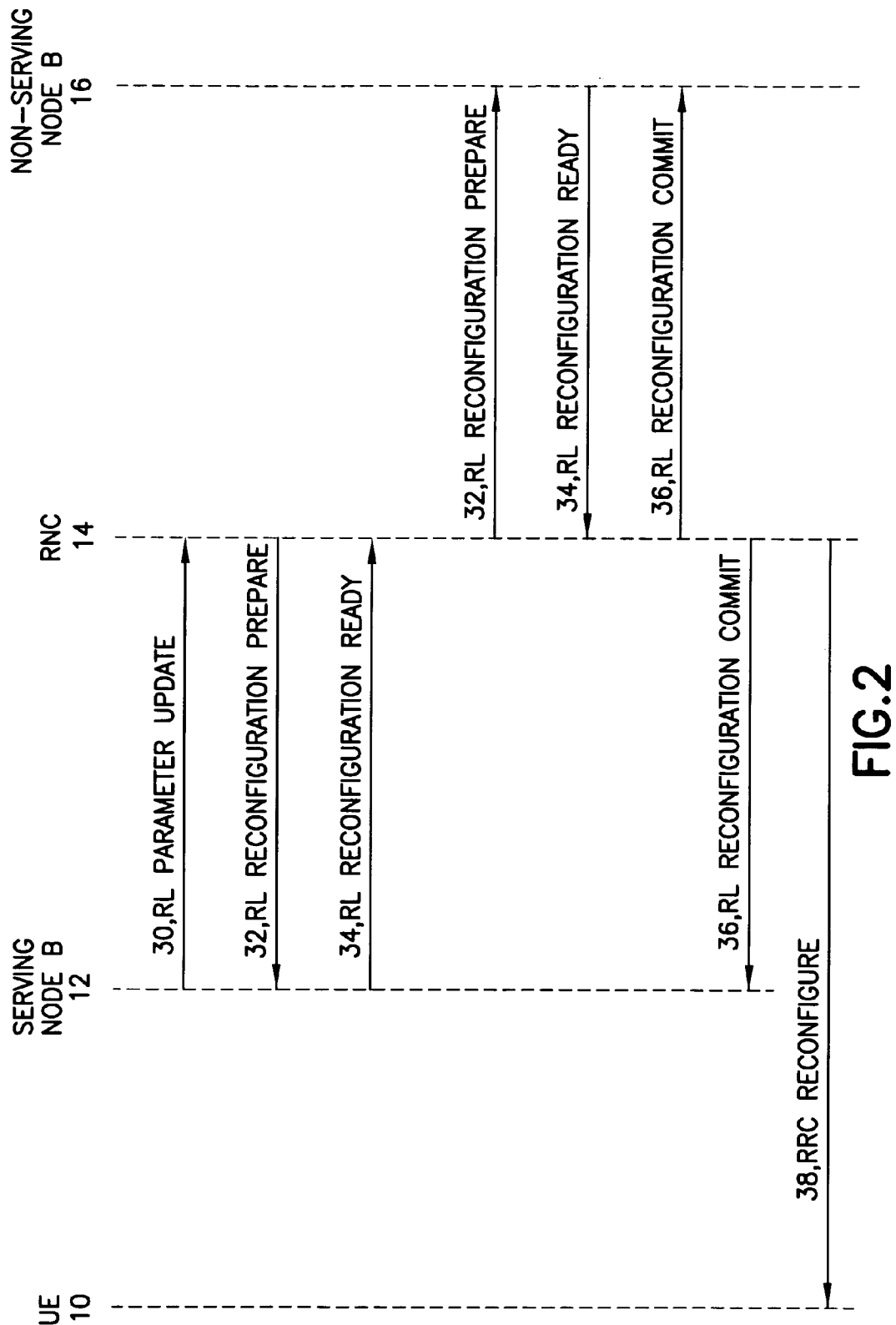
FIG. 2 is a signaling diagram for the devices of FIG. 1 according to one embodiment of the invention.

In a case of a SHO of the UE 10, the controlling node 14 also sends a RADIO LINK RECONFIGURATION PREPARE (or REQUEST) message 32 with the "HARQ Process Allocation For 2 ms Non-Scheduled Transmission Grant" IE, to another Node B involved in the SHO, shown in FIG. 2 as the non-serving Node B 16 and understood as that Node B which will become the serving Node B for the UE 10 after the SHO is complete. After reception of a READY (or RESPONSE) message 34 from each of the SHO-involved Node Bs (12, 16), the controlling node 14 sends a RADIO LINK RECONFIGURATION COMMIT message 36 to all Node Bs (12, 16) involved in the SHO and sends a RRC RECONFIGURE message 38 to the UE 10 to reconfigure the hybrid automatic repeat request process allocation. The RRC RECONFIGURE message 38 may be relayed through the serving Node B 12.

FIGS. 4 and 6 show one example of how the change-indicator IE 20 and change grant IE 22 referred to above may be formatted and arranged. In those Figures, the new material that can be added to an existing specification (i.e., 3GPP TS25.433, ver 6.7.0) to implement an aspect of this invention is shown in the shaded rows.

In accordance with one example of a "HARQ Process Allocation For 2 ms Non-Scheduled Transmission Change Indicator" IE 20, that IE 20 can be inserted in an existing FDD RADIO LINK PARAMETER UPDATE INDICATION message 30, of which the other (pre-existing) IEs known in the art are shown in FIG. 4 in the un-bolded rows.

Note, this change-indicator IE 20 can be included in one IE which includes all IE used for HSUPA (currently this IE is the first), by example, the IE name is E-DCH FDD Update Information which is at the same level as the HS-DSCH FDD Update Information IE 24.

The HARQ Process Allocation For 2 ms Non-Scheduled Transmission Change Indicator 20 indicates in one embodiment the E-DCH MAC-d flow (the flow-id) for which the HARQ Process Allocation For 2 ms Non-Scheduled Transmission change is needed. This flow-specific IE 26 is shown by example at FIG. 5.

Implementation of the "HARQ Process Allocation For 2 ms Non-Scheduled Transmission Change Grant" IE 22 is shown by example at FIG. 6, where the shaded rows indicate the change-grant IE 22 used in embodiments described herein.

As seen at FIG. 7, an HS-SCCH Code Change Grant IE 28 may be used to signal the grant of the hybrid automatic repeat request allocation from the controlling node 14 to the Node B(s) 12, 16. This may be included in a RADIO LINK RECONFIGURATION PREPARE and REQUEST message for respective synchronized or unsynchronized processes.

It should be appreciated that the foregoing technique can be used as well for a "10 ms NST" process and for a "2 and 10 ms ST (Scheduled Transmission)" process, in addition to the "2 ms NST" process described above.

One non-limiting advantage that can be gained by the use of this invention is an improvement in the Node B 12 hardware resource management, as well as a reduction in those cases where the Node B 12 has to process an overload. Further, no new messages and procedures need be introduced, as the above embodiments of the invention can be implemented using IE modifications to existing messages.

Another exemplary embodiment of this invention may be better understood in the context of two proposed modifications: one to 3GPP TS 25.423 (Tdoc R3-051325, 3GPP TSG-RAN WG3 Meeting #49, Seoul, Korea, 7-11 Nov. 2005); and one to 3GPP TS 25.433 (Tdoc R3-051326, 3GPP TSG-RAN WG3 Meeting #49, Seoul, Korea, 7-11 Nov. 2005). Each of these were submitted with the cited priority documents. These documents, each entitled HARQ PROCESS MANAGEMENT FOR E-DCH, describe a change to those specifications such that scheduling mechanisms under the control of the Node B reserve and/or restrict certain HARQ processes for NST. The serving cell Node B signals to the SRNC the applicability of the allocated resources for NST/ST to HARQ processes, and the SRNC informs other Node B's in the E-DCH active set. This change was to resolve an inconsistency among different radio access network specifications under development (RAN2 and RAN3).

In accordance with the further exemplary embodiments of this invention there is provided a HARQ Process Allocation for 2 ms Scheduled Transmission Grant IE 22, which is set per UE 10, as distinguished from the exemplary embodiments of this invention that are discussed above where the Non-Scheduled Transmission IE is set per E-DCH MAC-d flow. Either implementation, per MAC-d flow or per UE 10, can be implemented with the signaling of either FIGS. 2 or 3 and in either synchronized or unsynchronized reallocation processes, or other signaling consistent with these teachings.

Relatedly, it may be the case that the controlling node 14 serving the Node B 12 may change the value for hybrid automatic repeat request process allocation at anytime. However, it may also be the case that it will be agreed that the controlling node will not change the value. These implementations are detailed above.

In accordance with enhanced signaling made possible by the exemplary embodiments of this invention, the RL PARAMETER UPDATE INDICATION directly includes the HARQ Process Allocation For 2 ms Non-Scheduled Transmission Grant per MAC-d flow and the HARQ Process Allocation For 2 ms Scheduled Transmission Grant per UE 12, as shown below. If the Node B needs to update the hybrid automatic repeat request process allocation for NST and/or hybrid automatic repeat request process allocation for ST, then the Node B can initiate a RADIO LINK PARAMETER UPDATE INDICATION message 40 including the HARQ process allocation for 2 ms NST GRANT IE for the concerned MAC-d flows and/or the HARQ process allocation for 2 ms ST GRANT IE. With this embodiment, the Node B 12 can suggest the NST/ST hybrid automatic repeat request process allocation value to the RNC 14.

Figure 3:
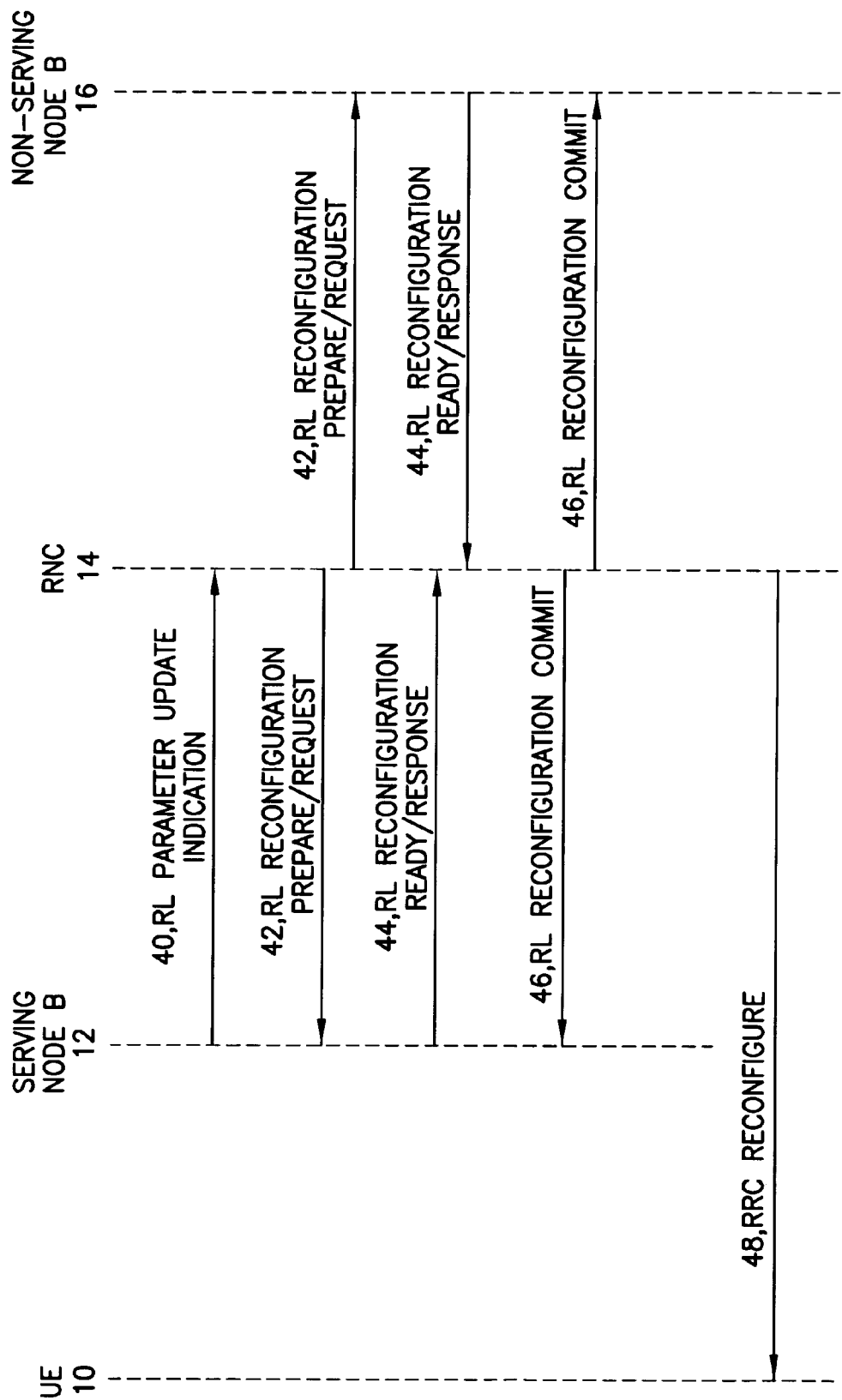
FIG. 3 is a signaling diagram for the devices of FIG. 1 according to another embodiment of the invention.

An exemplary signaling flow for this embodiment is shown in FIG. 3.

When the serving Node B 12 desires to reallocate the hybrid automatic repeat request process, the Node B 12 sends the RL PARAMETER UPDATE INDICATION message 40 with these newly defined IEs.

In response to the reception of the RL PARAMETER UPDATE INDICATION message 40 from the serving Node B 12 at the controlling node 14, the controlling node 14 sends a RL RECONFIGURATION PREPARE message 42 for the case of synchronized radio link reconfigurations, or a RL RECONFIGURATION REQUEST message 42 for the case of non-synchronized radio link reconfigurations, with the received IEs to all Node Bs, including the serving Node B 12 and all other Node B's 16 in the active E-DCH set. It should be noted in this regard that the controlling node 14 may be permitted to change the values that are forwarded to the Node Bs based on the received IEs, but in other embodiments the controlling node 14 may instead only forward the IEs as received to the Node Bs. In an embodiment, if the RL RECONFIGURATION PREPARE or REQUEST message 44 contains the E-DCH Grant Type and it is indicated as being a "E-DCH NST GRANT for an E-DCH MAC-d flow, the Node B shall assume non-scheduled grants being configured for that E-DCH MAC-d flow and shall use the information within the HARQ process allocation for 2 ms NST GRANT IE, if included, for the related resource allocation.

In response to the reception of the RL RECONFIGURATION PREPARE message 42 (synchronized reconfiguration), then each of the receiving Node Bs 12, 16 replies with a RL RECONFIGURATION READY message 44. Alternatively, in response to the reception of the RL RECONFIGURATION REQUEST message 42 (non-synchronized reconfiguration), then each of the receiving Node Bs 12, 16 replies with a RL RECONFIGURATION RESPONSE message 44.

In a synchronized radio link reconfiguration procedure, after the reception of the RL RECONFIGURATION READY message 44 from all Node Bs (12, 16), the controlling node 14 sends a RL RECONFIGURATION Commit message 46 to each of those Node B's (12, 16). In a non-synchronized radio link reconfiguration procedure, after the reception of the RL RECONFIGURATION RESPONSE message 44 from all Node Bs (12, 16), the controlling node 14 sends a RL RECONFIGURATION Commit message 46 to each of those Node B's (12, 16). In addition, for both the synchronous and non-synchronous cases the controlling node 14 informs the UE 10 of the new configuration of the hybrid automatic repeat request process by the RRC RECONFIGURATION message 48.

FIGS. 8-9 show examples of how the IEs referred to immediately above may be formatted and arranged. In those Figures the new material that can be added to an existing specification (i.e., 3GPP TS25.433 v6.7.0) to implement an aspect of this invention is shown in the shaded rows. In a FDD RADIO LINK PARAMETER UPDATE INDICATION message 40, FIG. 8 shows the E-DCH UPDATE INFORMATION IE Group 52, and at FIG. 9 is shown different IE's of that group 52, such as an E-DCH MAC-d Flow ID 54, NST Grant IE 56, and ST Grant IE 58, the latter two being the grant type noted above. Similar functionality may be obtained for a per-UE 10 hybrid automatic repeat request allocation, where the MAC-d Flow ID 54 need not be specified.

Based on the foregoing it should be apparent that the exemplary embodiments of this invention provide a method, apparatus and computer program product(s) to perform an efficient hybrid automatic repeat request process allocation on at least one of a per E-DCH MAC-d flow and a per UE basis. These teachings enable the Node B 12 to initiate a change to the hybrid automatic repeat request process by sending a RL PARAMETER UPDATE message 30, 40 to the controlling node 14 that bears one or more of the above IEs.

For the case where an E-DCH is being reconfigured, the ST grant-indicator IE 58 within the RADIO LINK RECONFIGURATION PREPARE message 32, 42 (or within the RL RECONFIGURATION REQUEST message 42 for non-synchronized reconfiguration) is used by the drift radio network subsystem/drift base station subsystem (DRNS/DBSS; e.g., the RNC 14 in this instance) for the related resource allocation operations. At a serving cell change, the Node B 12 sends a RADIO LINK RECONFIGURATION READY message 34, 44 (or a RL RECONFIGURATION RESPONSE message 44 for non-synchronized reconfiguration) to the controlling node 14 that includes the E-DCH FDD UPDATE INFORMATION IE field 52 (FIG. 8) with the NST grant IE 56 and/or the ST grant IE 58. Note also that a non-serving Node B 16 may send a similar message to the controlling node 14 (or a non-serving RNC if the same RNC does not control both the serving Node B 12 and the non-serving Node B 16). The same may be exchanged at a change or modification of the serving E-DCH radio link, without the UE 10 changing from one serving Node B to a new one.

The NST grant IE 56 shown in FIG. 9 indicates those hybrid automatic repeat request processes that are allowed. In one embodiment, the MAC-d PDU's for a MAC-d flow are only allowed to be transmitted in those processes for which the bit is set to "1". In other embodiments, the NST grant IE 56 and the ST grant IE 58 can be combined into one bit-string IE of length greater than one, where each bit of the string corresponds to a particular hybrid automatic repeat request process. Embodiments of this invention enable the Node B to initiate such hybrid automatic repeat request process changes as detailed above, which can be on a per-UE or on a per-MAC-d flow basis.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

I claim:

1. A method comprising:
    initiating at a Node B a hybrid automatic repeat request re-allocation by sending from the Node B to a serving radio network controller a RADIO LINK PARAMETER UPDATE INDICATION message that comprises at least one of a hybrid automatic repeat request process allocation for 2 ms non-scheduled transmission GRANT information element and a hybrid automatic repeat request process allocation for 2 ms scheduled transmission GRANT information element, said at least one information element indicating a value for hybrid automatic repeat request process re-allocation;
    receiving at the Node B from the serving radio network controller one of a RADIO LINK RECONFIGURATION PREPARE message or a RADIO LINK RECONFIGURATION REQUEST message that contains the said at least one information element;
    responsive to receiving the RADIO LINK RECONFIGURATION PREPARE message or the RADIO LINK RECONFIGURATION REQUEST message, sending from the Node B to the serving radio network controller a RADIO LINK RECONFIGURATION READY message or a RADIO LINK RECONFIGURATION RESPONSE message;
    receiving at the Node B from the serving radio network controller a RADIO LINK RECONFIGURATION COMMIT message for the case of synchronized radio link reconfiguration; and
    re-allocating the hybrid automatic repeat request process according to the received RADIO LINK RECONFIGURATION PREPARE message or the received RADIO LINK RECONFIGURATION REQUEST message.

2. The method of claim 1, wherein:
    RADIO LINK PARAMETER UPDATE INDICATION message;
    the RADIO LINK RECONFIGURATION PREPARE or REQUEST message;
    the RADIO LINK RECONFIGURATION READY or RESPONSE message; and
    the RADIO LINK RECONFIGURATION COMMIT message;
    each comprises at least one of Node B Application Part NBAP message or a Radio Node Subsystem Application Part message.

3. A method comprising:
    receiving from a Node B a RADIO LINK PARAMETER UPDATE INDICATION message that comprises at least one of a hybrid automatic repeat request process allocation for 2 ms non-scheduled transmission GRANT information element and a hybrid automatic repeat request process allocation for 2 ms scheduled transmission GRANT information element, said at least one information element indicating a value for hybrid automatic repeat request process re-allocation;
    responsive to receiving the RADIO LINK PARAMETER UPDATE INDICATION message, sending to the Node B one of a RADIO LINK RECONFIGURATION PREPARE message and a RADIO LINK RECONFIGURATION REQUEST message that contains the said at least one information element; and thereafter
    responsive to receiving from the Node B one of a RADIO LINK RECONFIGURATION READY message or a RADIO LINK RECONFIGURATION RESPONSE message, sending to the Node B a RADIO LINK RECONFIGURATION COMMIT message for the case of synchronized radio link reconfiguration.

4. The method of claim 3, wherein:
    RADIO LINK PARAMETER UPDATE INDICATION message;
    the RADIO LINK RECONFIGURATION PREPARE or REQUEST message;
    the RADIO LINK RECONFIGURATION READY or RESPONSE message; and
    the RADIO LINK RECONFIGURATION COMMIT message;
    each comprises at least one of Node B Application Part NBAP message or a Radio Node Subsystem Application Part message.

5. The method of claim 3 executed in association with a handover of a user equipment to or from the Node B, wherein:
    sending to the Node B one of a RADIO LINK RECONFIGURATION PREPARE message and a RADIO LINK RECONFIGURATION REQUEST message comprises sending that message to all Node B's involved in the handover;
    and wherein sending to the Node B a RADIO LINK RECONFIGURATION COMMIT message comprises, responsive to receiving from all Node B's involved in the handover a RADIO LINK RECONFIGURATION READY message or a RADIO LINK RECONFIGURATION RESPONSE message, sending to all Node B's involved in the handover the RADIO LINK RECONFIGURATION COMMIT message for the case of synchronized radio link reconfiguration.

6. An information bearing medium storing a program of machine-readable instructions, executable by a digital data processor, to perform actions directed toward re-allocating a hybrid automatic repeat request process, the actions comprising:

receiving from a Node B a RADIO LINK PARAMETER UPDATE INDICATION message that comprises at least one of a hybrid automatic repeat request process allocation for 2 ms non-scheduled transmission GRANT information element and a hybrid automatic repeat request process allocation for 2 ms scheduled transmission GRANT information element indicating a value for hybrid automatic repeat request process re-allocation;

responsive to receiving the RADIO LINK PARAMETER UPDATE INDICATION message, sending to the Node B one of a RADIO LINK RECONFIGURATION PREPARE message and a RADIO LINK RECONFIGURATION REQUEST message that contains the said at least one information element;

responsive to receiving from the Node B one of a RADIO LINK RECONFIGURATION READY message and a RADIO LINK RECONFIGURATION RESPONSE message, sending to the Node B a RADIO LINK RECONFIGURATION COMMIT message for the case of synchronized radio link reconfiguration.

7. The medium of claim 6 executed in association with a handover of a user equipment to or from the Node B, wherein:

sending to the Node B one of a RADIO LINK RECONFIGURATION PREPARE message and a RADIO LINK RECONFIGURATION REQUEST message comprises sending the RADIO LINK RECONFIGURATION PREPARE message or RADIO LINK RECONFIGURATION REQUEST message to all Node B's involved in the handover;

and wherein sending to the Node B a RADIO LINK RECONFIGURATION COMMIT message comprises, responsive to receiving from all Node B's involved in the handover one of a RADIO LINK RECONFIGURATION READY message and a RADIO LINK RECONFIGURATION RESPONSE message, sending to all Node B's involved in the handover the RADIO LINK RECONFIGURATION COMMIT message for the case of synchronized radio link reconfiguration.

8. An integrated circuit in combination with software embodied on a computer readable medium, configured to cooperate so as to signal for a re-allocation of a hybrid automatic repeat request process by:

initiating a hybrid automatic repeat request re-allocation by sending from a Node B to a controlling node of a radio network a RADIO LINK PARAMETER UPDATE INDICATION message that comprises at least one of a hybrid automatic repeat request process allocation for 2 ms non-scheduled transmission GRANT information element and a hybrid automatic repeat request process allocation for 2 ms scheduled transmission GRANT information element indicating a value for hybrid automatic repeat request process re-allocation;

responsive to receiving from the controlling node one of a RADIO LINK RECONFIGURATION PREPARE message and a RADIO LINK RECONFIGURATION REQUEST message that contains the said at least one information element, sending to the controlling node one of a RADIO LINK RECONFIGURATION READY message and a RADIO LINK RECONFIGURATION RESPONSE message;

receiving from the controlling node a RADIO LINK RECONFIGURATION COMMIT message for the case of synchronized radio link reconfiguration;

re-allocating the hybrid automatic repeat request process according to the said RADIO LINK RECONFIGURATION PREPARE message or RADIO LINK RECONFIGURATION REQUEST message.

9. A system comprising a Node B coupled through a communication interface to a controlling node of a radio network, each of the Node B and the controlling node comprising embodied software and a processor configured to:

at the Node B:

send to the controlling node a RADIO LINK PARAMETER UPDATE INDICATION message that comprises at least one of a hybrid automatic repeat request process allocation for 2 ms non-scheduled transmission GRANT information element and a hybrid automatic repeat request process allocation for 2 ms scheduled transmission GRANT information element indicating a value for hybrid automatic repeat request process re-allocation;

responsive to receiving from the controlling node one of a RADIO LINK RECONFIGURATION PREPARE message and a RADIO LINK RECONFIGURATION REQUEST message, send to the controlling node one of a RADIO LINK RECONFIGURATION READY message and a RADIO LINK RECONFIGURATION RESPONSE message;

and at the controlling node:

responsive to receiving the PARAMETER UPDATE INDICATION, send to the Node B one of the RADIO LINK RECONFIGURATION PREPARE message and the RADIO LINK RECONFIGURATION REQUEST message that contains the said at least one information element;

responsive to receiving from the Node B one of the RADIO LINK RECONFIGURATION READY message and the RADIO LINKL RECONFIGURATION RESPONSE message, sending to the Node B a RADIO LINK RECONFIGURATION COMMIT message for the case of synchronized radio link reconfiguration.

10. A method comprising:

sending from a drift radio network controller to a second radio network controller a RADIO LINK PARAMETER UPDATE INDICATION message that comprises at least one of a hybrid automatic repeat request process allocation for 2 ms non-scheduled transmission GRANT information element and a hybrid automatic repeat request process allocation for 2 ms scheduled transmission GRANT information element, said at least one information element indicating a value for hybrid automatic repeat request process re-allocation;

receiving at the drift radio network controller from the second radio network controller one of a RADIO LINK RECONFIGURATION PREPARE message and a RADIO LINK RECONFIGURATION REQUEST message that contains the said at least one information element;

responsive to receiving the RADIO LINK RECONFIGURATION PREPARE message or the RADIO LINK RECONFIGURATION REQUEST message, sending from the drift radio network controller to the second radio network controller a RADIO LINK RECONFIGURATION READY message or a RADIO LINK RECONFIGURATION RESPONSE message;

receiving at the drift radio network controller from the second radio network controller a RADIO LINK RECONFIGURATION COMMIT message for the case of synchronized radio link reconfiguration.

11. An apparatus comprising a program of computer instructions embodied in a local memory, a processor, and a communications interface configured to communicate with a network element, wherein the program is arranged to cause the processor to:
- send to the network element via the interface a RADIO LINK PARAMETER UPDATE INDICATION message that comprises at least one of a hybrid automatic repeat request process allocation for 2 ms non-scheduled transmission GRANT information element and a hybrid automatic repeat request process allocation for 2 ms scheduled transmission GRANT information element, said at least one information element indicating a value for hybrid automatic repeat request process re-allocation;
- receive via the interface from the network element one of a RADIO LINK RECONFIGURATION PREPARE message and a RADIO LINK RECONFIGURATION REQUEST message that contains the said at least one information element; and thereafter
- send to the network element a RADIO LINK RECONFIGURATION READY message or a RADIO LINK RECONFIGURATION RESPONSE message, and to receive from the network element a RADIO LINK RECONFIGURATION COMMIT message for the case of synchronized radio link reconfiguration.

12. The apparatus of claim 11, wherein the apparatus comprises a drift controller of a radio network.

13. The medium of claim 6, disposed within a controlling node of a radio network.

14. An apparatus comprising a program of computer instructions embodied in a local memory, a processor, and a communications interface, wherein the program when executed on the processor causes the apparatus to perform at least the following:
- initiating at a Node B a hybrid automatic repeat request re-allocation by sending from the Node B to a serving radio network controller a RADIO LINK PARAMETER UPDATE INDICATION message that comprises at least one of a hybrid automatic repeat request process allocation for 2 ms non-scheduled transmission GRANT information element and a hybrid automatic repeat request process allocation for 2 ms scheduled transmission GRANT information element, said at least one information element indicating a value for hybrid automatic repeat request process re-allocation;
- receiving at the Node B from the serving radio network controller one of a RADIO LINK RECONFIGURATION PREPARE message or a RADIO LINK RECONFIGURATION REQUEST message that contains the said at least one information element;
- responsive to receiving the RADIO LINK RECONFIGURATION PREPARE message or the RADIO LINK RECONFIGURATION REQUEST message, sending from the Node B to the serving radio network controller a RADIO LINK RECONFIGURATION READY message or a RADIO LINK RECONFIGURATION RESPONSE message;
- receiving at the Node B from the serving radio network controller a RADIO LINK RECONFIGURATION COMMIT message for the case of synchronized radio link reconfiguration; and
- re-allocating the hybrid automatic repeat request process according to the received RADIO LINK RECONFIGURATION PREPARE message or the received RADIO LINK RECONFIGURATION REQUEST message.

15. The apparatus of claim 14, wherein:
- RADIO LINK PARAMETER UPDATE INDICATION message;
- the RADIO LINK RECONFIGURATION PREPARE or REQUEST message;
- the RADIO LINK RECONFIGURATION READY or RESPONSE message; and
- the RADIO LINK RECONFIGURATION COMMIT message;
- each comprises at least one of Node B Application Part NBAP message or a Radio Node Subsystem Application Part message.

16. An apparatus comprising a program of computer instructions embodied in a local memory, a processor, and a communications interface, wherein the program when executed on the processor causes the apparatus to perform at least the following:
- receiving from a Node B a RADIO LINK PARAMETER UPDATE INDICATION message that comprises at least one of a hybrid automatic repeat request process allocation for 2 ms non-scheduled transmission GRANT information element and a hybrid automatic repeat request process allocation for 2 ms scheduled transmission GRANT information element, said at least one information element indicating a value for hybrid automatic repeat request process re-allocation;
- responsive to receiving the RADIO LINK PARAMETER UPDATE INDICATION message, sending to the Node B one of a RADIO LINK RECONFIGURATION PREPARE message and a RADIO LINK RECONFIGURATION REQUEST message that contains the said at least one information element; and thereafter
- responsive to receiving from the Node B one of a RADIO LINK RECONFIGURATION READY message or a RADIO LINK RECONFIGURATION RESPONSE message, sending to the Node B a RADIO LINK RECONFIGURATION COMMIT message for the case of synchronized radio link reconfiguration.

17. The apparatus of claim 16, wherein:
- RADIO LINK PARAMETER UPDATE INDICATION message;
- the RADIO LINK RECONFIGURATION PREPARE or REQUEST message;
- the RADIO LINK RECONFIGURATION READY or RESPONSE message; and
- the RADIO LINK RECONFIGURATION COMMIT message;
- each comprises at least one of Node B Application Part NBAP message or a Radio Node Subsystem Application Part message.

18. The apparatus of claim 16, wherein:
- sending to the Node B one of a RADIO LINK RECONFIGURATION PREPARE message and a RADIO LINK RECONFIGURATION REQUEST message further comprises sending that message to all Node B's involved in the handover;
- and wherein sending to the Node B a RADIO LINK RECONFIGURATION COMMIT message comprises, responsive to receiving from all Node B's involved in the handover a RADIO LINK RECONFIGURATION READY message or a RADIO LINK RECONFIGURATION RESPONSE message, comprises sending to all Node B's involved in the handover the RADIO LINK RECONFIGURATION COMMIT message for the case of synchronized radio link reconfiguration.

19. An information bearing medium storing a program of machine-readable instructions, executable by a digital data processor, to perform actions directed toward re-allocating a hybrid automatic repeat request process, the actions comprising:

initiating at a Node B a hybrid automatic repeat request re-allocation by sending from the Node B to a serving radio network controller a RADIO LINK PARAMETER UPDATE INDICATION message that comprises at least one of a hybrid automatic repeat request process allocation for 2 ms non-scheduled transmission GRANT information element and a hybrid automatic repeat request process allocation for 2 ms scheduled transmission GRANT information element, said at least one information element indicating a value for hybrid automatic repeat request process re-allocation;

receiving at the Node B from the serving radio network controller one of a RADIO LINK RECONFIGURATION PREPARE message or a RADIO LINK RECONFIGURATION REQUEST message that contains the said at least one information element;

responsive to receiving the RADIO LINK RECONFIGURATION PREPARE message or the RADIO LINK RECONFIGURATION REQUEST message, sending from the Node B to the serving radio network controller a RADIO LINK RECONFIGURATION READY message or a RADIO LINK RECONFIGURATION RESPONSE message;

receiving at the Node B from the serving radio network controller a RADIO LINK RECONFIGURATION COMMIT message for the case of synchronized radio link reconfiguration; and re-allocating the hybrid automatic repeat request process according to the received RADIO LINK RECONFIGURATION PREPARE message or the received RADIO LINK RECONFIGURATION REQUEST message.

20. The medium of claim 19, wherein:

RADIO LINK PARAMETER UPDATE INDICATION message;

the RADIO LINK RECONFIGURATION PREPARE or REQUEST message;

the RADIO LINK RECONFIGURATION READY or RESPONSE message; and the RADIO LINK RECONFIGURATION COMMIT message;

each comprises at least one of Node B Application Part NBAP message or a Radio Node Subsystem Application Part message.

\* \* \* \* \*